United States Patent [19]
Adams et al.

[11] Patent Number: 6,122,421
[45] Date of Patent: Sep. 19, 2000

[54] MAGNETOSTRICTIVE WAVELENGTH-SHIFTING DEVICES AND OPTICAL COMMUNICATION SYSTEMS COMPRISING SAME

[75] Inventors: Laura Ellen Adams, Basking Ridge; Rolando Patricio Espindola, Chatham; Sungho Jin, Millington; Hareesh Mavoori, Berkeley Heights; Thomas Andrew Strasser, Warren, all of N.J.

[73] Assignee: Lucent Technologies Inc., Murray Hill, N.J.

[21] Appl. No.: 09/159,907

[22] Filed: Sep. 24, 1998

[51] Int. Cl.[7] .................. G02B 6/34; H01S 3/30; H04J 14/02
[52] U.S. Cl. .................. 385/37; 385/31; 385/123; 372/6; 359/130; 359/341
[58] Field of Search .................. 385/10, 13, 15, 385/31, 37, 123; 372/6; 359/130, 341

[56] References Cited

U.S. PATENT DOCUMENTS

| | | | |
|---|---|---|---|
| 5,694,501 | 12/1997 | Alavie et al. | 385/37 |
| 5,781,677 | 7/1998 | Jin et al. | 385/37 |
| 5,812,711 | 9/1998 | Glass et al. | 385/37 |
| 5,982,963 | 11/1999 | Feng et al. | 385/37 |
| 5,999,546 | 12/1999 | Espindola et al. | 372/20 |
| 5,999,671 | 12/1999 | Jin et al. | 385/37 |

FOREIGN PATENT DOCUMENTS

| | | | |
|---|---|---|---|
| 0 856 752 | 8/1998 | European Pat. Off. . | |
| 0 856 753 | 8/1998 | European Pat. Off. | G02F 6/16 |

OTHER PUBLICATIONS

Cruz J L et al: "Fibre Bragg Grantings Tuned and Chirped Using Magnetic Fields" Electronics Letters, GB, IEE Stevenage, vol. 33, No. 3, pp. 235–236 XP000725938 ISSN: 0013–5194 *the whole document*.

Hill P C et al: "Strain Gradient Chirp of Fibre Bragg Grantings" Electronics Letters, GB, IEEE, Stevenage, vol. 30, No. 14, pp. 1172–1174.

*Primary Examiner*—Brian Healy
*Attorney, Agent, or Firm*—Mathews, Collins, Shepherd & Gould, P.A.

[57] ABSTRACT

A programmable and latchable device for wavelength shifting and chromatic dispersion compensating is disclosed. An optical grating such as a Bragg grating, a nonchirped grating, or a linearly or non-linearly chirped grating, is magnetostrictively strained to alter the dispersion compensator characteristics. In a preferred embodiment, a gradient magnetostrictive body is bonded along its length to the fiber grating. In yet another preferred embodiment, a magnetostrictive body is bonded onto the length of the fiber grating, and a gradient generating, programmable and latchable magnet component is placed adjacent the magnetostrictive body. The body is then latchably strained to a desired level by controlling the extent of magnetization in the magnetostrictive material and the magnet so as to induce or enhance chirping characteristics in the grating. Various optical applications using such are disclosed.

21 Claims, 8 Drawing Sheets

MAGNETOSTRICTIVE WAVELENGTH-SHIFTING DEVICES AND OPTICAL COMMUNICATION SYSTEMS COMPRISING SAME

RELATED APPLICATIONS

This case is related to U.S. patent application Ser. No. 09/159,178, filed Sep. 23, 1998, bending, and U.S. patent application Ser. No. 09/158,672, filed Sep. 22, 1998, now U.S. Pat. No. 5,999,546, having common inventors hereto and assigned to the present assignee.

FIELD OF THE INVENTION

This invention relates to a magnetostrictively controllable, wavelength-shifting device and in particular, to a wavelength-shifting device that may be tuned with a magnetostrictive body and without a continuous use of power. The invention further relates to a dispersion compensator device and an optical communication system comprising such a device.

BACKGROUND OF THE INVENTION

Optical fibers and gratings are useful for telecommunication transmission and networking. Optical gratings are useful in controlling the paths or properties of traveling light. Gratings based on optical fibers are of particular interest as components in modern telecommunication systems. Basically, optical fibers are thin strands of glass capable of transmitting information-containing optical signals over long distances with low loss. In essence, an optical fiber is a small diameter waveguide comprising a core having a first index of refraction surrounded by a cladding having a second (lower) index of refraction. As long as the refractive index of the core exceeds that of the cladding, a light beam propagated along the core exhibits total internal reflection, and it is guided along the length of the core. Typical optical fibers are made of high purity silica, and various concentrations of dopants may be added to control the index of refraction.

In long-distance transmission of optical signals, the accumulation of signal dispersion may be a serious problem. This problem intensifies where there is an increase in the distance the signals travel or the number of channels in a wavelength-division-multiplexed (WDM) optical communication system. Efforts to compensate for chromatic dispersion to date have involved use of dispersion compensating fibers, dispersion compensating gratings, or a combination of both. See M. I. Hayee et al, IEEE PHOTONICS TECHNOLOGY LETT., Vol. 9, No. 9, p. 1271 (1997); R. I. Laming et al., IEEE PHOTONICS TECHNOLOGY LETT., Vol. 8, No. 3 (1996); W. H. Loh et al., IEEE PHOTONICS TECHNOLOGY LETT., Vol. 8, No. 7 (1996); K. O. Hill et al., OPT. LETT., Vol. 19, p. 1314 (1994); and U.S. Pat. No. 5,701,188 issued to M. Shigematsu et al., on Dec. 23, 1997, incorporated herein by reference. These dispersion compensating devices, however, are not flexible and provide only a fixed degree of compensation for chromatic dispersion.

Optical gratings are important elements for selectively controlling specific wavelengths of light transmitted within optical communication systems. Such gratings may include Bragg gratings, long-period gratings, and diffraction gratings. These gratings typically comprise a body of material with a plurality of spaced-apart optical grating elements disposed in the material. Often, the grating elements comprise substantially equally-spaced index perturbations, slits, or grooves, but unequally-spaced (chirped) gratings are used as well.

For all types of gratings, it would be highly useful to be able to reconfigure or tune the grating to selectively adjust the controlled wavelengths. A difficulty with conventional Bragg gratings is that they filter light of only a fixed wavelength. Each grating selectively reflects light in a narrow bandwidth centered around $\lambda = 2n_{eff}\Lambda$. However, in many applications, such as wavelength division multiplexing (WDM), it would be desirable to have a grating whose wavelength response can be controllably altered. Long-period fiber grating devices provide wavelength dependent loss and may be used for spectral shaping. A long-period grating couples optical power between two copropagating modes with low back reflections. A difficulty with conventional long-period gratings, however, is that their ability to dynamically equalize amplifier gain is limited, because they filter only a fixed wavelength acting as wavelength-dependent loss elements. Each long-period grating with a given periodicity ($\lambda$') selectively filters light in a narrow bandwidth centered around the peak wavelength of coupling, $\lambda_p$. Diffraction gratings typically comprise reflective surfaces containing a large number of parallel etched lines of substantially equal spacing. Light reflected from the grating at a given angle will have a different spectral content depending on the spacing. The spacing in conventional diffraction gratings, and hence the spectral content, is generally fixed.

One attempt to make a tunable waveguide grating involves applying strain to the grating using a piezoelectric element. See Quetel et al., 1996 Technical Digest Series, Conf. on Optical Fiber Communication, San Jose, Calif., Feb. 25–Mar. 1, 1996, Vol. 2, p. 120, paper No. WF6. A difficulty with this approach is that the strain produced by piezoelectric actuation is relatively small which limits the tuning range of the device. Moreover, this approach requires that electrical power be continuously applied at relatively high voltage, e.g., approximately 100 volts. Other tunable gratings involving the application of strain to the grating are disclosed in U.S. Pat. application Serial No. 08/791,081, now U.S. Pat. No. 5,781,677, filed by Jin et al. on Jan. 29, 1997, U.S. Pat. application Ser. No. 09/020,206, bending, filed by Espindola et al. on Feb. 6, 1996, U.S. Pat. application Ser. No. 08/971,956, bending, filed by Jin et al. on Oct. 27, 1997, and U.S. Pat. application Ser. No. 08/971,953, now U.S. Pat. No. 5,957,574, filed by Fleming et al. on Oct. 27, 1997, all of which were assigned to the present assignee and are incorporated herein by reference. The use of magnetostriction for grating chirping was disclosed in J. L. Cruz el al., ELECTRONIC LETT. 33(3), p. 235 (1997), but the approach there did not demonstrate programmable or latchable magnetostrictive strain and did not encompass a dispersion compensating device.

As may be appreciated, those concerned with technologies involving optical communication systems continue to search for new devices and methods to selectively control and filter transmitted wavelengths and compensate for chromatic dispersion. In particular, it would be advantageous to have a device for programmably shifting wavelengths that does not require the continuous application of power. This invention discloses a magnetostrictively tunable and latchable device for shifting wavelengths and compensating for dispersion, and optical communication systems comprising such a device.

SUMMARY OF THE INVENTION

Summarily described, the invention comprises a tunable optical wavelength shifting device including a length of waveguide with a grating region, an elongated magnetostrictive body bonded along a length thereof to the waveguide at the grating region, and a source for exposing the body to a magnetic field. The magnetic field causes the body to expand or contract (depending on whether it is formed of a positive or negative magnetostrictive material), which thereby induces an elastic strain in the body to adjust the spacings between the grating elements and the wavelength response of the device. The body may be made latchable or non-latchable. A latchable and programmable magnetic component may be used with the non-latchable body to provide a non-uniform strain on the fiber. The device advantageously may be used as a chromatic dispersion compensator and in optical communication systems, including amplifiers and wavelength-division multiplexer/demultiplexer systems.

BRIEF DESCRIPTION OF THE DRAWINGS

The advantages, nature and additional features of the invention will appear more fully upon considering the illustrative embodiments described in the accompanying drawings. In the drawings.

Figure 1A:
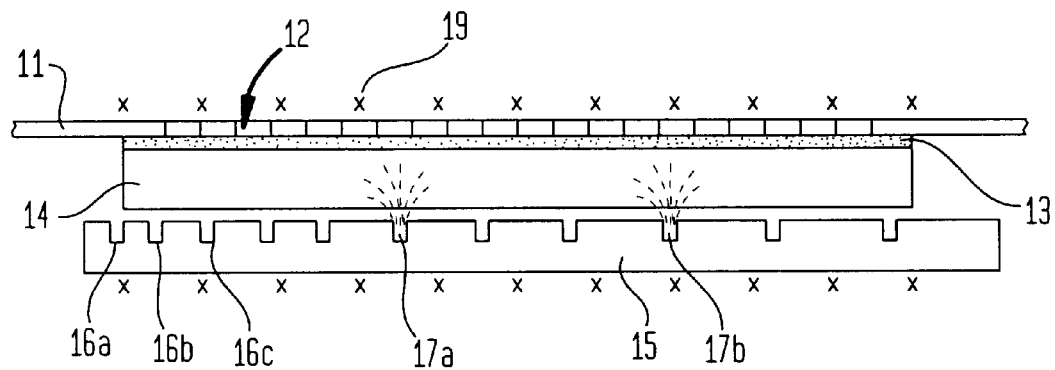
FIGS. 1A–1C schematically illustrate exemplary embodiments of an inventive tunable wavelength shifting device comprising a magnetostrictive body and latchable magnetic component.

It is to be understood that these drawings are for purposes of illustrating the concepts of the invention and are not to scale.

DETAILED DESCRIPTION OF THE INVENTION

Referring to the drawings, the invention comprises a length of waveguide such as an optical fiber 11 having a grating region 12, and a magnetostrictive body 14 which is elongated and bonded along its length at bond region 13 to the grating 12. The magnetostrictive body may be nonlatchable, in which case the device may be used in combination with a latchable magnet 15, or the magnetostrictive body may itself be latchable. A source for supplying a magnetic field, such as, for example, a solenoid 19 is disposed proximal the body or the magnet (if used) or both to magnetize the magnet and strain the body.

More particularly, FIG. 1A illustrates an embodiment comprising at least one optical grating (e.g. optical fiber grating) 12 and at least one magnetostrictive body 14, wherein a bond 13 along the length of the body secures it to the length of the grating 12. The bond 13 may be formed with adhesives, such as glass adhesives (e.g., low melting point glass), epoxy, by solder bonding, brazing, or by other substances or devices as are known. The body 14 may be made with a positive or negative magnetostrictive material. Upon exposure to a magnetic field, the length of the body will elongate (with positive magnetostriction), or contract (with negative magnetostriction). In this embodiment, at least one programmable and latchable magnet 15 is disposed alongside the body, and at least one solenoid 19, which supplies a predetermined magnitude of magnetic field when an electric current is provided, is coiled around both the body 14 and the magnet 15. The expansion or contraction of the magnetostrictive material 14 upon magnetization by the solenoid 19 and magnet 15 strains the optical grating 12 and hence changes its resonant wavelength. The programmably latchable magnet has notches or perturbations (e.g., 16a, 16b, 16c, etc.), non-uniformly disposed along its length to provide leakage flux from various locations (e.g., 17a, 17b). The intensity of the flux varies in a spatial manner, thus creating a gradient. The gradient can be created by varying the concentration of the number of notches along the length of the body, and additionally by utilizing the field divergence from each notched area. When the programmable magnet is magnetized by the solenoid 19, it generates a non-uniform gradient field which induces a non-uniform strain in the magnetostrictive body. This in turn produces a nonuniform change in the grating periodicity and chirping.

Figure 1B:
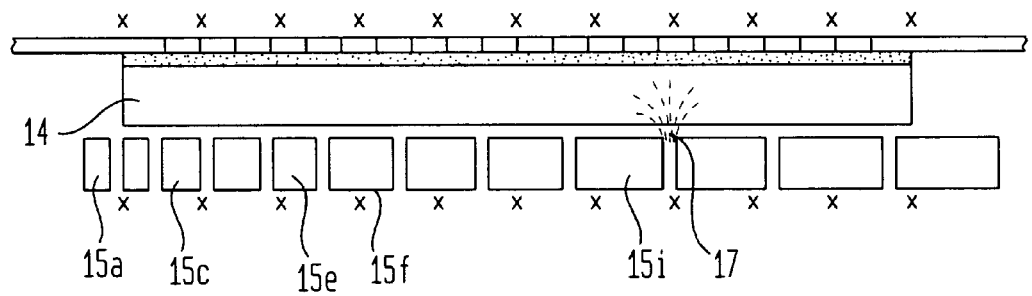

The magnetostrictive body or the programmable magnet or both can be segmented into many parts. For example, FIG. 1B shows an embodiment comprising segmented magnets (15a, . . . 15c, . . . 15e, 15f, . . . 15i, etc.), and through the gaps between the segments, leakage magnetic flux (e.g., 17) is provided to the body. The dimensions of the magnets may vary, e.g., the lengths of the segmented magnets may be made progressively longer (e.g., as shown, the segmented magnets progressively increase in length from 15a to 15i, etc.), or they may be made progressively shorter, or otherwise be non-uniform in dimension so that an overall gradient in strain is induced, as in FIG. 1A. The gradient can be formed by varying the concentration of gaps between the magnets along each body and additionally, by utilizing the field divergence from each gap area. The induced strain in the magnetostrictive body can be a tensile or compressive strain (causing an elongation or shortening of the body), depending on whether the body is fabricated with a positive or negative magnetostrictive material.

Figure 1C:
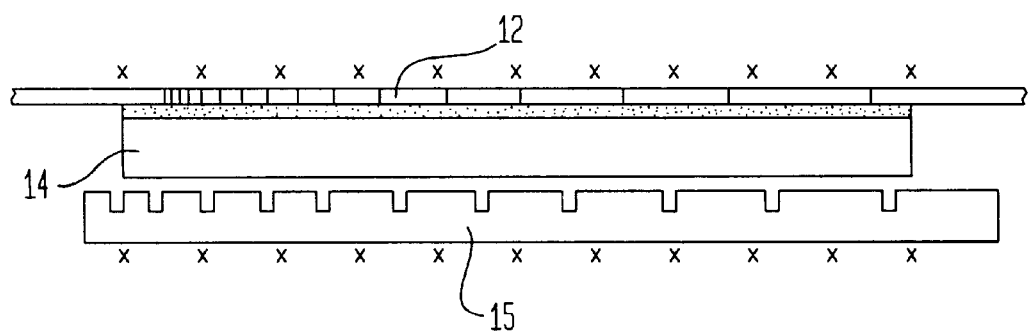

When there is a gradient in the magnetostrictive body, as in FIGS. 1A–1B, a nonuniform strain is induced in the grating which may create a chirped (linearly or nonlinearly chirped) grating structure from an originally non-chirped grating. Alternatively, the grating in the inventive device may be a pre-chirped (linearly, nonlinearly, or any-pattern chirped), as in FIG. 1C. The nonuniform strain provided by the inventive device in that case can further increase the slope of the chirping gradient along the length of the grating. It should be understood that although FIGS. 1A–1C show a single grating region, multiple-in-series gratings may be used and strained simultaneously with one magnetostrictive device according to the invention. A gradient straining of the grating such as achieved with the embodiments of FIGS. 1A and 1B is preferred. However, a magnetostrictive device may be formed according to the invention with non-gradient straining of the fiber, which can be useful for some dispersion compensating applications, such as where a pre-chirped grating is used.

The materials comprising the body 14 can have either positive or negative magnetostriction, causing an increase or decrease in the length of the body, respectively. Exemplary materials that may be used to fabricate the body exhibiting negative magnetostriction and having a saturation strain ($\epsilon_s$)

include nickel ($\epsilon_s \sim -38 \times 10^{-6}$), cobalt ($\epsilon_s \sim -50 \times 10^{-6}$), and SmFe$_2$ ($\epsilon_s \sim -2340 \times 10^{-6}$). Exemplary materials exhibiting positive magnetostriction include the following alloys and compositions: Fe-20 wt % Ni ($\epsilon_s \sim +33 \times 10^{-6}$), 70% Co-30% Fe ($\epsilon_s \sim +130 \times 10^{-6}$), Fe-30% Cr-15% Co ($\epsilon_s \sim +61 \times 10^{-6}$), the Fe—Al—Ni—Co alloy commonly known as Alnico ($\epsilon_s \sim +36 \times 10^{-6}$), Fe$_3$O$_4$ ferrite ($\epsilon_s \sim +32 \times 10^{-6}$), TbFe$_2$ ($\epsilon_s \sim +2600 \times 10^{-6}$), and a Tb$_{0.28}$Dy$_{0.72}$Fe$_2$ alloy ($\epsilon_s \sim +1100 \times 10^{-6}$). The magnitude of the magnetostriction, as well as its field-dependent behavior, varies somewhat with the material composition and processing. Optimizing these parameters is advantageous in maximizing the strain. For further background concerning magnetostrictive materials, see R. M. Bozorth, FERROMAGNETISM, Chapter 13, pp. 647–49, 663–69 (Van Nostrand, N.Y. 1951); A. E. Clark, *AIP Conference Proc.* No. 18, American Institute of Physics, p. 1015 (New York 1974); and W. R. Jones, *IEEE Trans. Mag.*, Vol. MAG-17, p. 1459 (1981), all of which are incorporated herein by reference.

Preferred materials for fabricating the magnetic component to provide a latchable device are those whose magnetic properties are modifiable by a pulse magnetic field. Suitable materials include Fe—Cr—Co, Fe—Al—Ni—Co (Alnico), Cu—Ni—Fe (Cunife), Co—Fe—V (Vicalloy), specially-processed, low-coercivity (H$_c$) rare-earth cobalt Sm—Co or Nd—Fe—B, and Ba-ferrite or Sr-ferrite materials. A preferred range of coercivity for a programmable magnet is below about 500 Oe and more preferably below about 100 Oe for ease of programming by re-magnetization using a solenoid pulse field. The coercivity preferably is above about 10 Oe and more preferably above 30 Oe for maintaining the stability of the remanent magnetization and stability against demagnetization due to stray magnetic fields.

For satisfactory latching when the field is removed, the programmable magnet should have a square magnetization-hysteresis loop ("M-H loop") with a squareness ratio (remanent magnetization to saturation magnetization) of at least about 0.85, preferably at least about 0.90, even more preferably at least about 0.95. For ease of control, the loop is desirably skewed by at least about 50% of H$_c$. Intentional skewing of an M-H loop is described, for example, in U.S. Pat. application Ser. No. 09/020,206, filed Feb. 6, 1998 by Espindola et al., assigned to the present assignee and incorporated herein by reference. Mechanically ductile and easily formable or machineable magnet alloys such as Fe—Cr—Co, Cu—Ni—Fe, or Co—Fe—V are particularly advantageous for they may be shaped into desired geometries, such as the geometries shown in FIGS. 1A–1C. Stable permanent magnets with high coercive forces (e.g., where the coercivity is greater than about 1000 Oe), such as Sm—Co or Nd—Fe—B, are less preferred (unless modified to exhibit lower coercive forces) due to difficulties in reprogramming remanent magnetization.

Figure 2:
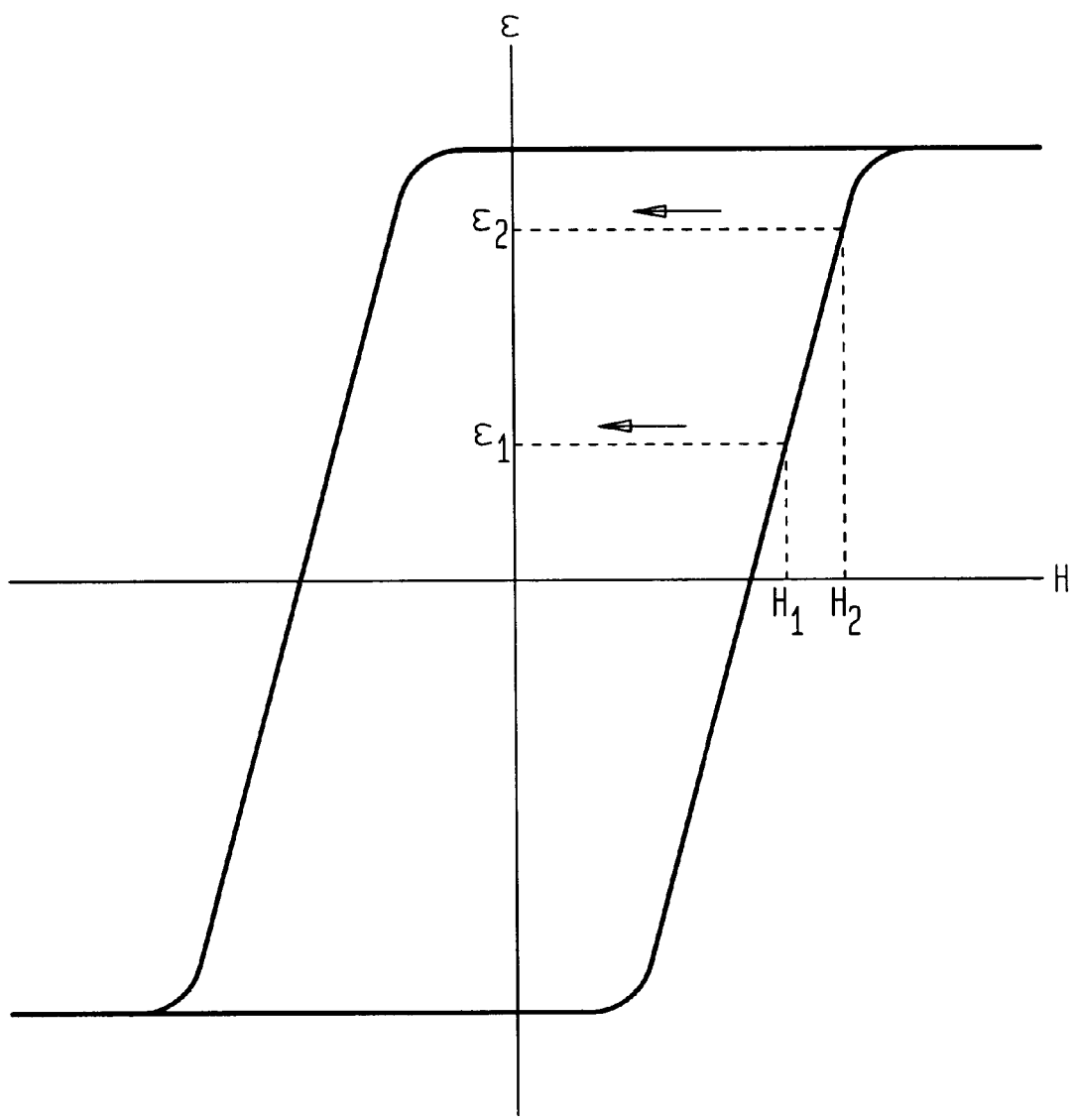
FIG. 2 schematically illustrates the latchability of the magnetostrictively-generated strain and resultant wavelength shift that may be achieved with the invention.

An Fe-28% Cr-7% Co alloy may be deformation-aged to yield a square M-H loop with H$_c$ of 70 Oe, a dimension of about 0.18" in diameter and 4" in length. Where the M-H loop is skewed by about ~60 Oe, a M-H loop similar to that shown in FIG. 2 is produced. For applied magnetic fields of H$_1$ and H$_2$, the corresponding magnetization is latchably retained after the field is removed, and the corresponding separation between the two magnets and the induced strains on the dispersion compensating grating, $\epsilon_1$ and $\epsilon_2$, are also latchably retained. With the latching, the device may be operated without a continuous supply of power. To vary the degree of tuning, the strain induced in the grating by the magnetostrictive body may be altered and latched by changing the magnetization in the programmable magnets. This can be achieved by either increasing the applied field or by demagnetizing and remagnetizing one or more of the magnets to a new field level. For magnetization of the magnets using a solenoid, a pulse field (a pulse current in the solenoid) can conveniently be used for high-speed, low-power operation of the device. A preferred duration or speed of the pulse field is in the range of about 10 to 10$^{-6}$ seconds, and more preferably about 10$^{-1}$ to 10$^{-4}$ seconds. The current pulse may have various shapes including sinusoidal, rectangular, trapezoidal, triangular, and irregular. The solenoid can be a single solenoid or it can be split into two or more segments with independent controls if desired.

Figure 3A:
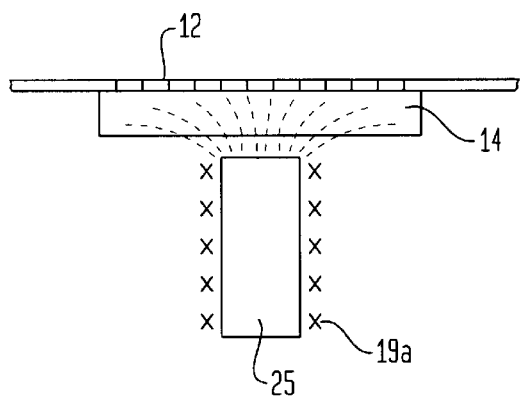
FIGS. 3A–3D illustrate embodiments alternative to those shown in FIG. 1.
Figure 3B:
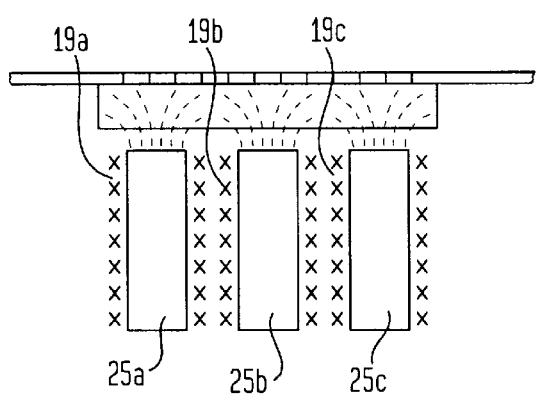
Figure 3C:
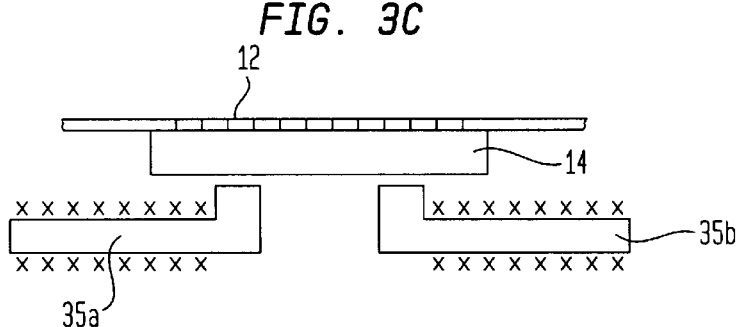
Figure 3D:
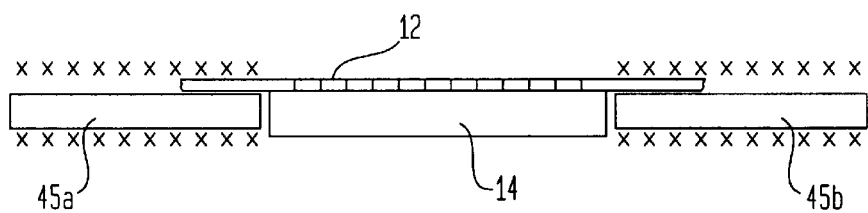

FIGS. 3A–3D show alternative embodiments of the invention illustrating various contemplated arrangements for the programmable magnets which may provide an inherent magnetic flux gradient to the magnetostrictive body (e.g., without use of notches, segments, or dimensional gradients as in FIGS. 1A–1C). In FIG. 3A, a single elongated magnetic component 25 is disposed substantially perpendicular to the body, and in FIG. 3B, a plurality of elongated magnetic components 25$a$, 25$b$, 25$c$, are so disposed. In these embodiments, one or more solenoids 19$a$, 19$b$, 19$c$, may be coiled around the magnetic components without being coiled around the body 14. The field from the poles of the magnets tends to diverge with a gradient in strength and hence gives a grating-chirping effect. In FIG. 3C, two L-shaped magnets 35$a$, 35$b$, are placed alongside the body with their bottom end members facing, and in FIG. 3D, two rod-like magnetic components 45$a$, 45$b$, are placed at either end of the magnetostrictive body, instead of beside it, so that the magnetic field strength decreases as a function of the distance from the poles, providing a gradient field effect on the magnetostrictive body.

Figure 4A:
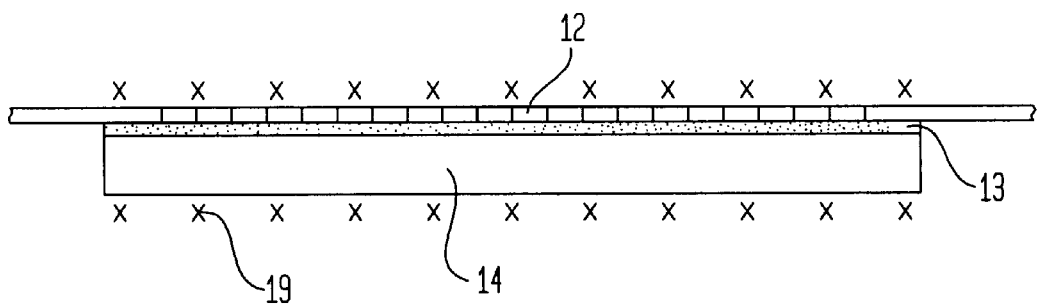
FIGS. 4A–4C are alternative embodiments of the inventive compensator using various magnetostrictive bodies and no additional magnetic components.
Figure 4B:
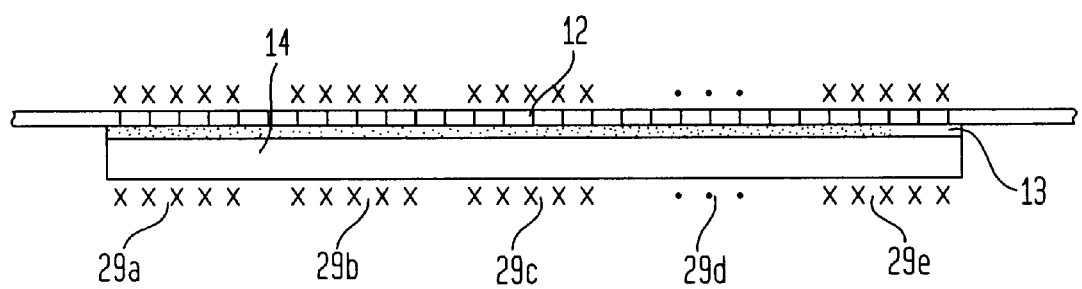
Figure 4C:
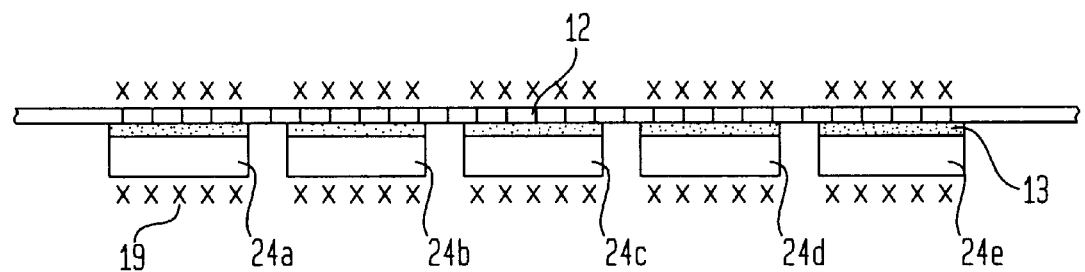

In FIG. 4A, an embodiment is shown where the body 14 itself possesses a gradient magnetostriction property along its length. The magnetostriction of the material can depend on the chemistry of the material, crystallographic texture, microstructure, or internal stress distribution along or within the body. Using these microstructural features, a magnetostriction gradient may be built into the body itself, e.g., by using a gradient in materials chemistry along the length of the body, plastic deformation or a gradient heat treatment along its length. With such a built-in magnetostriction gradient, chirping may be induced or enhanced in the optical fiber grating (which may be nonchirped or pre-chirped), without use of programmable and latchable magnetic components, providing for a simpler design. FIGS. 4B and 4C represent yet further alternatives, i.e., FIG. 4B illustrates a design comprising a plurality of segmented solenoids 29$a$, 29$b$, 29$c$, 29$d$, 29$e$, etc., and FIG. 4C shows a design comprising segmented magnetostrictive bodies 24$a$, 24$b$, 24$c$, 24$d$, 24$e$. Each segment can be programmed differently (e.g., with different solenoid drive currents) or fabricated differently (e.g., with a different number of turns in the solenoid), so as to supply a different field and hence a different amount of magnetostriction from segment to segment resulting in an overall gradient magnetostriction. The magnetostrictive bodies in FIGS. 4A–4C may be made of material that is highly latchable in magnetostriction after the applied field is removed, or they may be used together with programmable magnet(s) to make the bodies latchable if the material has low or no latchability in magnetostriction, similarly as illustrated in FIGS 1A–1C and 3A–3D.

Figure 5A:
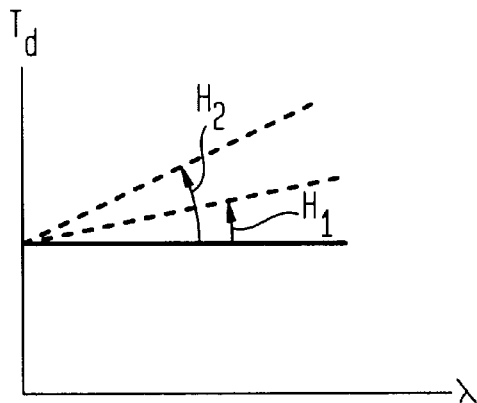
FIGS. 5A–5E schematically illustrate various types of dispersion tuning that may be achieved with the invention.
Figure 5B:
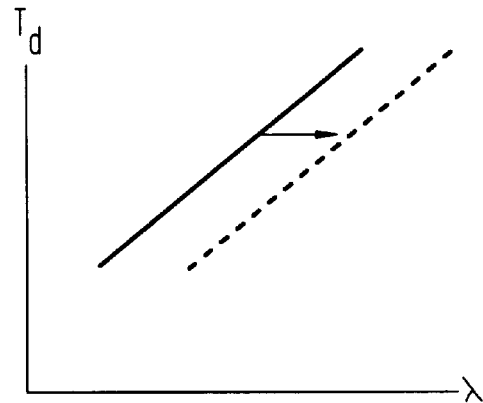
Figure 5C:
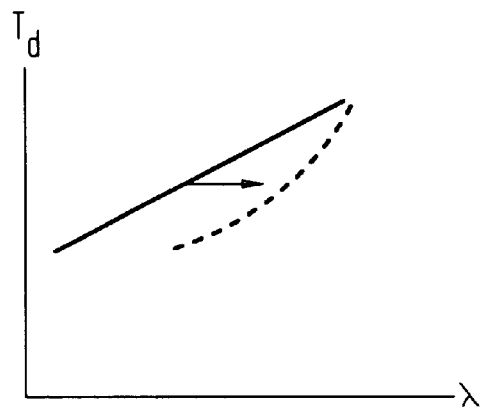
Figure 5D:
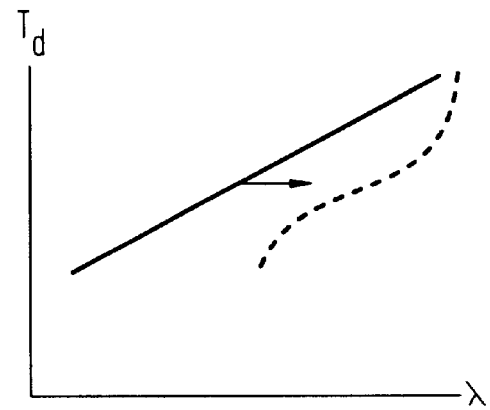
Figure 5E:
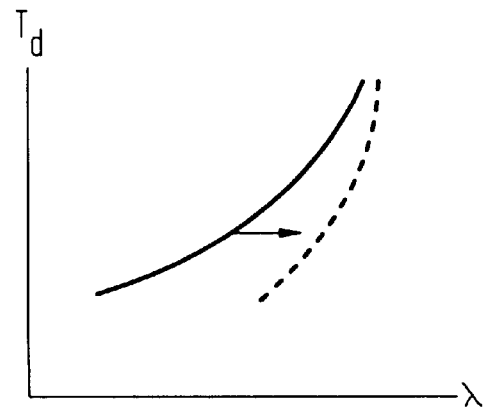

FIGS. 5A–5E are plots of the time delay characteristics T$_d$ (which is a measure of wavelength dispersion) as a function of wavelength $\lambda$ for different embodiments of the inventive device, using different grating regions. These plots illustrate various capabilities of the device in terms of altering the chromatic dispersion characteristics of the fiber. FIG. 5A plots data where a nonchirped grating is used and strained using the magnetostrictive body to form a chirped grating (e.g., as in FIGS. 1A–1B). The slope, $T_d$ (time delay)/$\lambda$ (wavelength), may be adjusted by changing the applied actuation field and hence the latchable strain in the grating (e.g., 15a, FIGS. 1A–1B). FIG. 5B shows the translational shift of the $T_d$-$\lambda$ curve where strain has been induced in a uniformly (linearly) chirped grating. FIGS. 5C and 5D illustrate the effects of an embodiment where a linearly chirped grating is used and strained to exhibit the characteristics of a nonlinear chirped grating. FIG. 5E reflects use of a nonlinearly chirped grating which has been made more nonlinear. There are particular advantages as to each of these embodiments depending on the application, as should be apparent to one skilled in the field.

Figure 6:
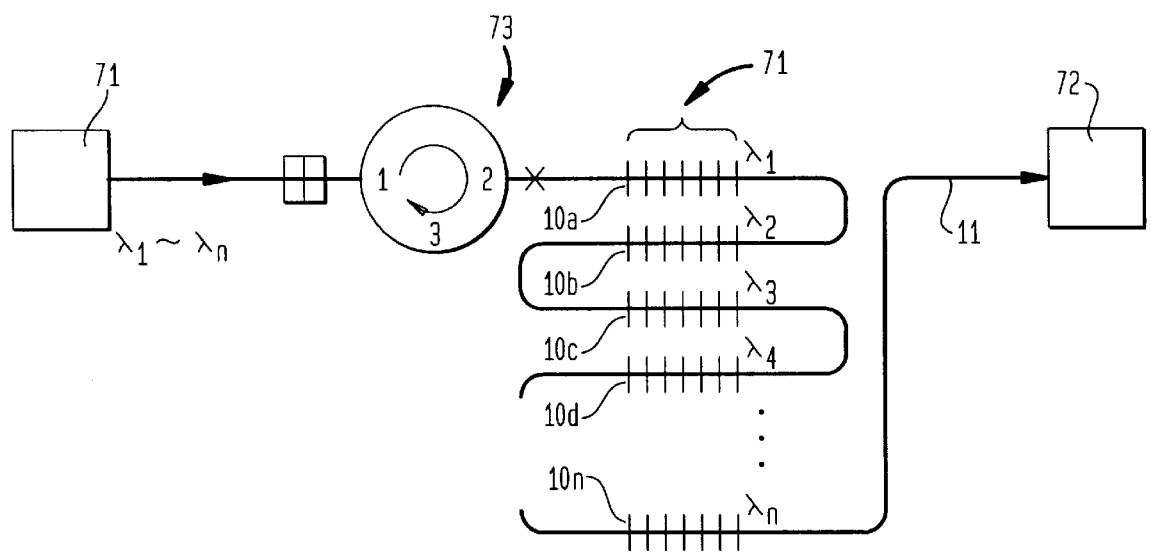
FIG. 6 schematically illustrates an n-channel WDM communication system comprising a dispersion-compensator assembly including the inventive device.

The tunable devices illustrated in FIGS. 1–5 and their variations can be used for general wavelength filtering or channel add/drop applications in dense WDM networks. Because of the chirp-generating capability, they are especially useful for compensating chromatic dispersion in transmitted optical signals. In FIG. 6, for example, a wavelength division multiplexed (WDM) communications system is schematically illustrated comprising a transmitter 70, an improved N-channel multiplexer/demultiplexer 71, and a receiver 72, all connected by trunk fiber 11. The input to the fiber 11 from the source 70 consists of optical signals at several wavelengths, $\lambda_1$ to $\lambda_n$. The improved multiplexer 71 comprises at least one circulator 73 and a series of dispersion compensating fiber gratings (10a, 10b, 10c, 10d, . . . 10n), each of which is independently tunable with magnetostrictive bodies as previously described. The gratings may be nonchirped, linearly-chirped or nonlinearly-chirped. The inventive dispersion compensator is capable of having a broad bandwidth, and each dispersion compensator can compensate for a few to several channels. Thus, the total number of the tunable dispersion compensators used in the system can be substantially reduced as compared with previous systems.

Figure 7:
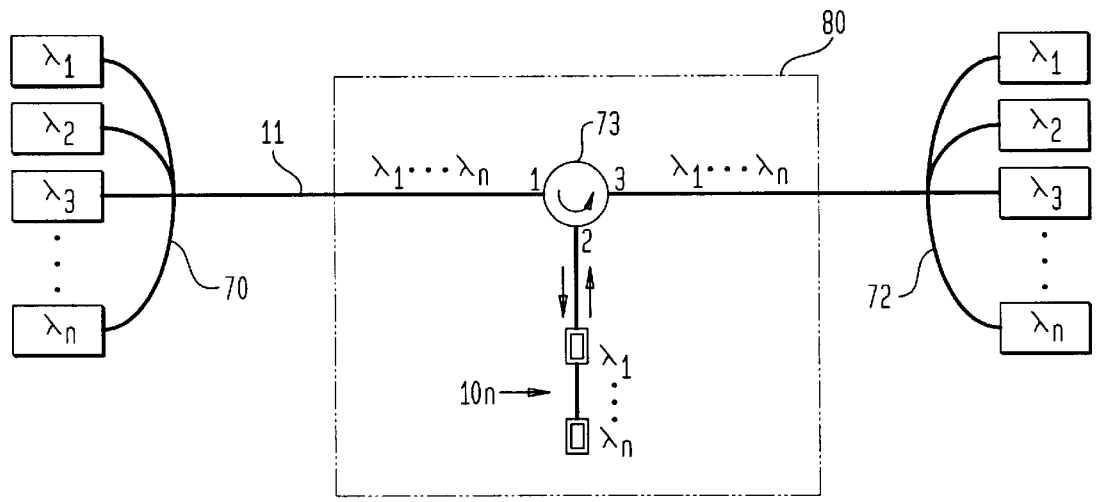
FIGS. 7–10 schematically illustrate optical communication systems comprising at least one dispersion compensator comprising the inventive device.

FIGS. 7–10 schematically illustrate optical communication systems comprising inventive dispersion-compensating devices tunable with magnetostrictive bodies as previously described. In FIG. 7, a dispersion compensating module (DCM) at boxed region 80 comprises an optical circulator and a total of "n" number of dispersion-compensating gratings 10n, each independently tunable with magnetostrictive bodies as previously described. The order in which the gratings may be placed in the module depends on the chromatic dispersion that has accumulated in the system before reaching the DCM. For example, if the accumulated dispersion ($A_D$) for channel 1 at $\lambda_1$ is greater than that of channel n at $\lambda_n$ ($A_D\lambda_1 > A_D\lambda_n$), then the gratings are arranged in the order shown, i.e., the first compensating grating of the DCM is at $\lambda_1$ and the last is at $\lambda_n$. If the accumulated dispersion for channel 1 at $\lambda_1$ is less than that of channel n at $\lambda_n$ ($A_D\lambda_1 < A_D\lambda_n$), then the gratings are arranged in the reverse order shown, i.e., the first compensating grating of the DCM is at $\lambda_n$ and the last is at $\lambda_1$. This DCM may comprise part of a dense WDM system (DWDM), further comprising a multi-wavelength transmitter 70, a length of optical fiber 11, and a multi-wavelength receiver 72.

Alternatively to the embodiment of FIG. 7, the DCM may comprise a single tunable dispersion compensating chirped fiber grating, as previously described, in place of the "n" number of independently tunable dispersion-compensating gratings 10n. In this case, the direction of the chirped gratings will depend on the accumulated chromatic dispersion, i.e., if at channel 1 $A_D\lambda_1 > A_D\lambda_n$, then the chirped fiber grating is disposed such that at the point of entry, the grating is at $\lambda_1$, but if at channel 1 $A_D\lambda_1 < A_D\lambda_n$, the chirped fiber grating is disposed such that at the point of entry, the grating is at $\lambda_n$.

Figure 8:
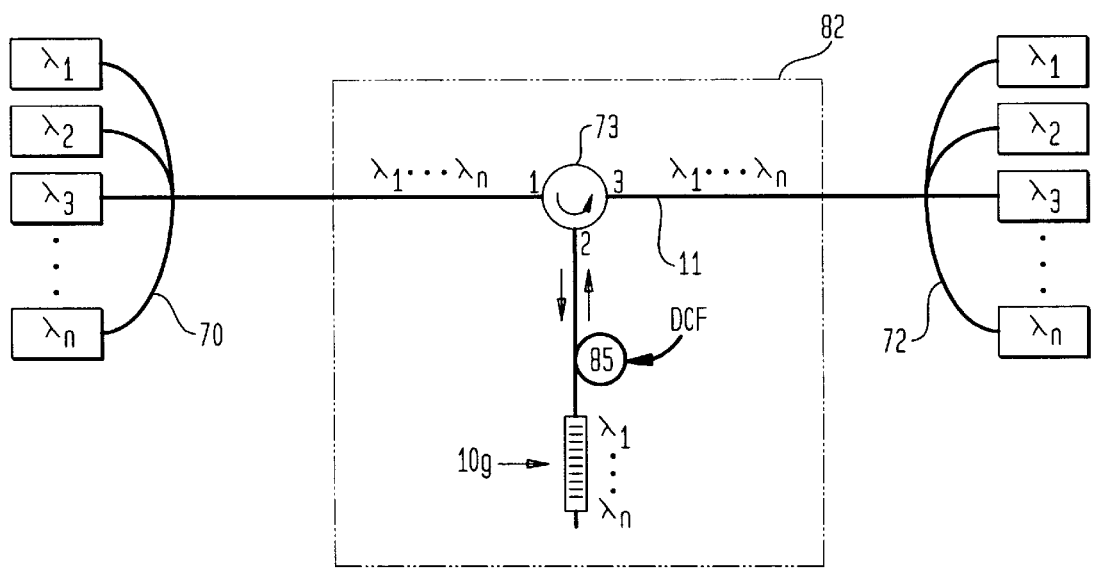

FIG. 8 schematically illustrates a system where a DCM 82 comprises an optical circulator 73, a length of dispersion compensating fiber (DCF) 85, and a single tunable dispersion compensating chirped fiber grating 10g. Alternatively to the single chirped grating device 10g, a plurality or n-number of independently tunable dispersion compensating gratings may be used (e.g., the n-number of gratings 10n of FIG. 7 may be substituted for the single chirped grating 10g of FIG. 8). In this case, the majority of the chromatic dispersion compensation is performed by the DCF 85. The remanent chromatic dispersion in each channel, due to a dispersion slope mismatch between the ideal compensator and the DCF, is compensated using the compensating chirped grating 10g (or the n-number of independently tunable dispersion compensating gratings 10n). The same principles described above with reference to FIG. 7 relating to the direction of the chirped dispersion grating 10g or the order of the n-number of gratings 10n apply with regard to the embodiment of FIG. 8. Also as in FIG. 7, this DCM 82 may comprise part of a DWDM further comprising a multi-wavelength transmitter 70, a length of optical fiber 11, and a multi-wavelength receiver 72.

Figure 9:
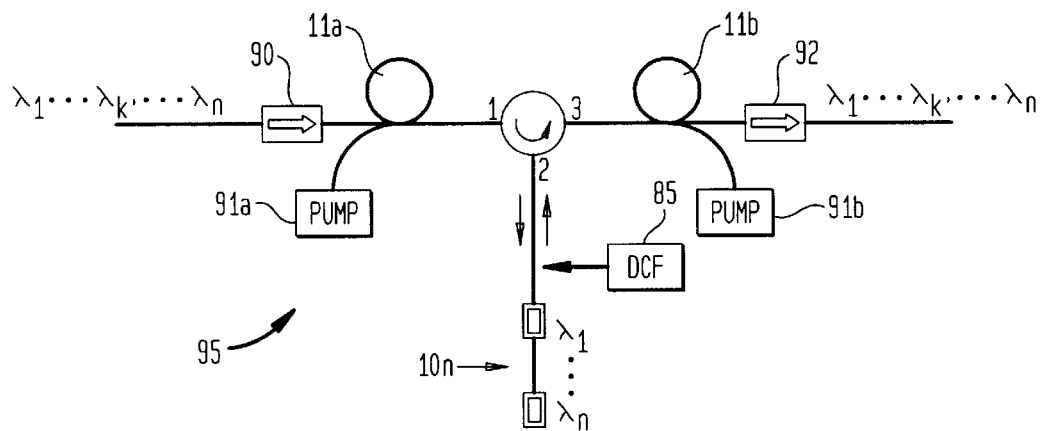
Figure 10:
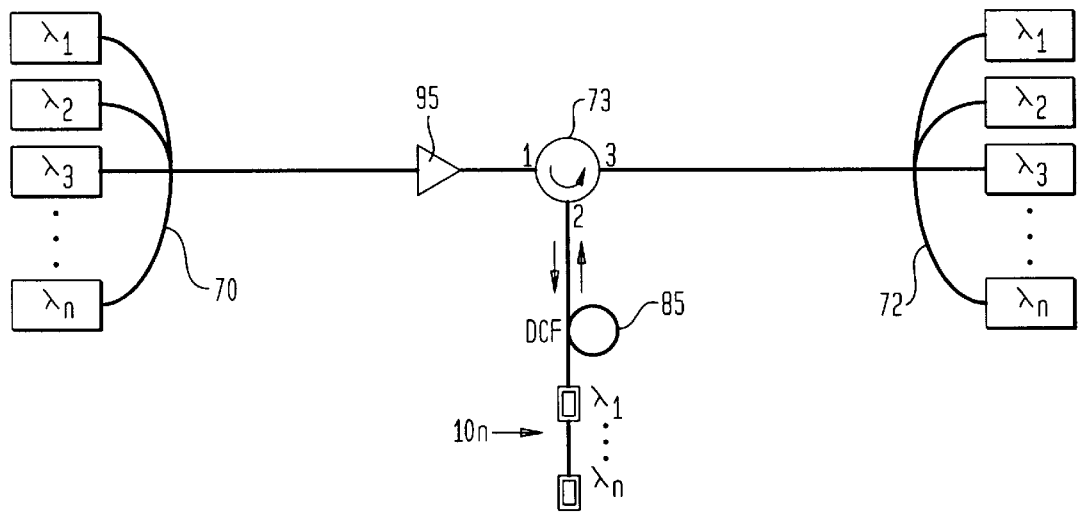

FIG. 9 schematically shows an amplifier 95 having a dispersion compensating module. The amplifier comprises an input isolator 90, a first length of rare-earth doped fiber 11a, a first pump 91 for optical pumping the first length of fiber 11a, a second length of rare-earth doped fiber 11b, a second pump 91b for optical pumping the second length of fiber 11b, an output isolator 92, a circulator 73, and "n" number of independently tunable dispersion-compensating gratings 10n. The optical amplifier provides the advantage that it not only compensates for chromatic dispersion, but it also amplifies the signals to offset losses introduced by the tunable compensator. Optionally, a dispersion compensating fiber 85 may be used in this amplifier assembly, similarly to FIG. 8. FIG. 10 schematically illustrates a DWDM comprising a multi-wavelength transmitter 70, a length of optical fiber 11, an amplifier 95 which may comprise the amplifier of FIG. 9 containing the DCM, a DCM, and a multi-wavelength receiver 72, where the DCM comprises an optical circulator 73, an optional length of dispersion compensating fiber (DCF) 85, and a series of tunable dispersion compensating fiber gratings 10n.

The grating-based dispersion compensator of this invention may be operated in a reflective mode, together with a circulator, as shown in the above-described embodiments. However, an alternative arrangement is to use the grating in the transmission mode rather than the reflective mode. In this case, preferably the grating is unchirped and apodized, and the dispersion exists close to the edge of the stop band where the transmission is high. Thus, dispersion is provided for the pass channel rather than for the reflected channel and a circulator may be avoided. By applying a constant tension to the grating, for example, by use of a magnetostrictive body, the central wavelength of the grating may be shifted. This changes the magnitude of the dispersion for the adjacent channel and thus provides a means for adjusting the dispersion of the grating. Another approach for operating the compensator in the transmission mode, avoiding use of the circulator, is to induce chirping in the grating, e.g. as previously described. In this case, the chirping and resultant broadening of the grating spectrum approaches the adjacent channel, thus causing the dispersion property to be altered without shifting the central wavelength.

It is to be understood that the above mentioned embodiments are illustrative of only a few of many embodiments which can represent applications of the invention. Numerous and varied other arrangements can be made by those skilled in the art without departing from the spirit and scope of the invention.

We claim:

1. An article comprising a tunable optical wavelength shifting device, the device comprising:
   a length of waveguide including a grating region having a plurality of spaced-apart grating elements;
   at least one magnetostrictive body bonded to the waveguide at the grating region; and
   at least one magnetic component disposed adjacent the magnetostrictive body for generating a magnetic field,
   wherein at least one of the at least one magnetostrictive body and the at least one magnetic component is gradient generating so that when the magnetostrictive body is exposed to the magnetic field, the magnetostrictive body is caused to expand or contract to induce a non-uniform elastic strain in the length of waveguide to adjust the spacings between the grating elements and the wavelength response of the device.

2. The article of claim 1, in which the length of waveguide comprises a length of optical fiber.

3. The article of claim 1, in which the grating is an optical Bragg grating.

4. The article of claim 1, in which the grating is a non-chirped grating before operation of the device, whereby inducing non-uniform elastic strain in the length of waveguide alters the grating to a chirped grating.

5. The article of claim 1, in which the grating is a uniformly or non-uniformly chirped grating and inducing non-uniform elastic strain in the length of waveguide increases or alters the chirping in the grating.

6. An article comprising a tunable optical wavelength shifting device, the device comprising:
   a length of waveguide including a grating region having a plurality of spaced-apart grating elements;
   at least one magnetostrictive body bonded to the waveguide at the grating region so that when the body is exposed to a magnetic field, the body is caused to expand or contract thereby inducing an elastic strain to adjust the spacings between the grating elements and the wavelength response of the device,
   in which the body comprises a non-latchable magnetostrictive body, and further comprising at least one programmable and latchable magnetic component and at least one solenoid for creating a latchable wavelength shift in the grating.

7. The article of claim 1, in which the at least one magnetic component has an elongated shaped, is gradient-generating by having a dimensional gradient oriented alongside the magnetostrictive body and further comprising a solenoid coiled around the magnetostrictive body and the magnetic component, the dimensional gradient providing a spatially variable leakage flux from a plurality of locations of the magnetic component.

8. The article of claim 7 in which the dimensional gradient comprises a plurality of notches on a surface of the magnetic component.

9. The article of claim 1, in which the magnetostrictive body is gradient generating by having a dimensional, microstructure, or chemistry gradient in such a way that a gradient in magnetostrictive properties is induced so that chirping is induced or enhanced in the grating when the magnetostrictive body is uniformly strained.

10. The article of claim 1, in which the at least one magnetic component is comprised of a material whose remanent magnetization is modifiable by a pulse magnetic field.

11. The article of claim 1, in which the at least one magnetic component is elongated and disposed substantially perpendicular to the magnetostrictive body, and further comprising a solenoid coiled around the component wherein the magnetic component is gradient-generating in that the magnetic field generated from the magnetic component diverges with a gradient in strength along the length of the magnetostrictive body.

12. The article of claim 1, wherein the non-uniform strain is induced by the at least one magnetic component comprising two elongated magnetic components disposed along an axis parallel to the axis of the body with their mating poles spaced apart, whereby the magnetic field strength decreases as a function of the distance from the poles, providing a gradient field effect on the magnetostrictive body.

13. The article of claim 1, in which the elastic strain is latchable so that the wavelength response of the device may be controllably altered without a continuous supply of power.

14. The article of claim 1, in which the device comprises an optical fiber dispersion compensator.

15. A dispersion compensating module comprising an optical circulator and at least one independently-tunable compensator device according to claim 14.

16. A wavelength division multiplexed optical communications system comprising a source of multiple wavelength optical signal channels, an optical fiber trunk, a receiver for receiving multiple optical signal channels, a multiplexer/demultiplexer, and one or more dispersion compensating gratings according to claim 14.

17. The system of claim 16 further comprising a length of dispersion compensating fiber.

18. A dispersion compensating module comprising at least one tunable dispersion compensating grating according to claim 1 operating in the transmission mode.

19. An optical amplifier comprising an input isolator, a first length of rare-earth doped fiber, a first pump for optical pumping the first length of fiber, a second length of rare-earth doped fiber, a second pump for optical pumping the second length of fiber, an output isolator, a circulator, and a plurality of tunable optical wavelength shifting devices, each of the tunable optical wavelength shifting devices comprising:
   a length of waveguide including a grating region having a plurality of spaced-apart grating elements;
   at least one elongated magnetostrictive body bonded alone its length to the waveguide at the grating region so that when the body is exposed to a magnetic field, the body is caused to expand or contract thereby inducing an elastic strain to adjust the spacings between the grating elements and the wavelength response of the device.

20. An article comprising a tunable optical wavelength shifting device, the device comprising:
   a length of waveguide including a grating region having a plurality of spaced-apart grating elements;
   at least one elongated magnetostrictive body bonded along its length to the waveguide at the grating region so that when the body is exposed to a magnetic field, the body is caused to expand or contract thereby inducing an elastic strain to adjust the spacings between the grating elements and the wavelength response of the device,
   in which the body comprises a positive or negative magnetostrictive material fabricated with one or more of Ni, Co, Fe, Sm, Cr, Tb, or Dy.

21. The article of claim 1 in which at least one of the magnetic component and the magnetostrictive body is gradient generating by being segmentized along the length of the waveguide.

* * * * *